Dec. 5, 1972    H. C. N. CLARKE    3,705,011
PHOTODECOMPOSITION METHOD AND APPARATUS
Filed Feb. 27, 1970
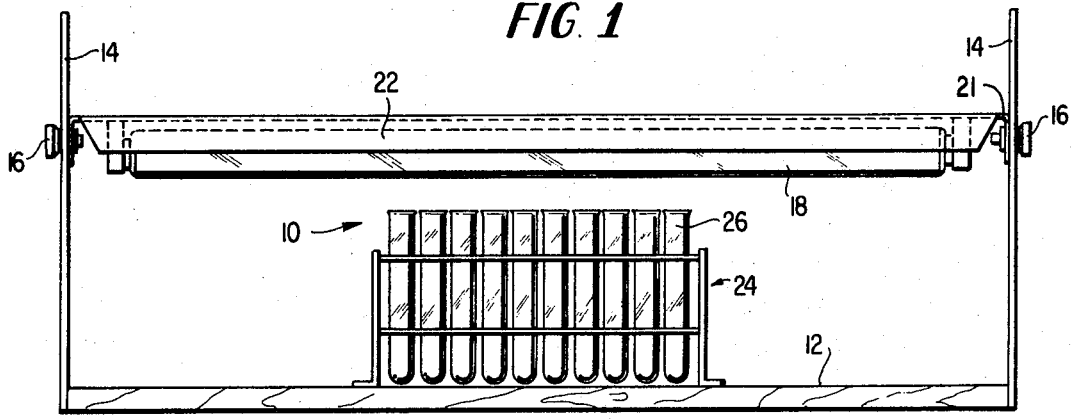
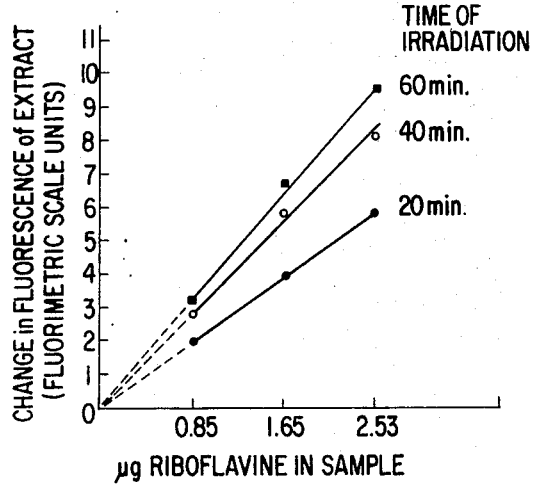
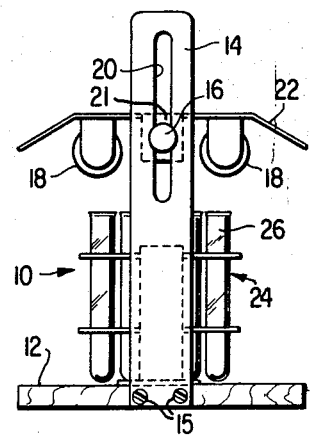
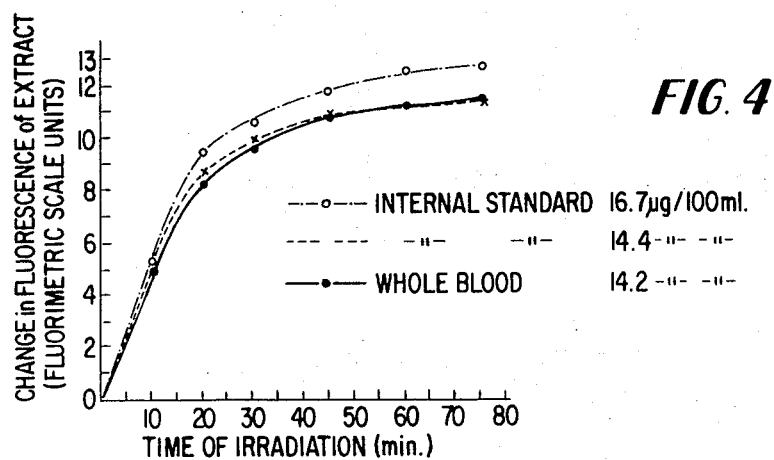
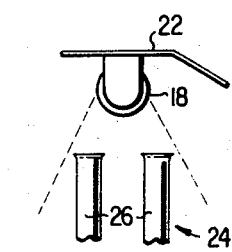
INVENTOR
H.C.N. CLARKE
LeBlanc & Shur
ATTORNEYS United States Patent Office 3,705,011
Patented Dec. 5, 1972

3,705,011
PHOTODECOMPOSITION METHOD AND
APPARATUS
Henry Courtenay Neville Clarke, 48 Frederick St.,
Port of Spain, Trinidad, West Indies
Filed Feb. 27, 1970, Ser. No. 15,094
Int. Cl. A61l 3/00; G01n 21/24, 33/16
U.S. Cl. 23—230 B          12 Claims

ABSTRACT OF THE DISCLOSURE

A photodecomposition method and apparatus for rapidly and dependably evaluating the riboflavin concentration in a large number of whole blood and urine samples as a diagnostic index of the riboflavin nutritive status to clarify the role of riboflavin in metabolic disturbances, and partcularly in liver disease and diabetes mellitus. The apparatus holds rows of samples which are subjected to controlled, incomplete photodecomposition through exposure by parallel overhead tropical daylight fluorescent lamps, at least one lamp disposed longitudinally along each two rows of sample containers, a preselected distance over the samples for a preselected time. The change in fluorescence of the sample and the standard over a given period of exposure is proportional to the riboflavin concentration. The method relating to blood samples comprises determination of the riboflavin concentration by comparison of the rate of photodecomposition of a butanol-pyridine extract of whole blood with a direct internal standard using a conventional photofluorimeter. The method relating to urine samples uses a conversion factor derived from the average change in fluorescence of standard solutions which will convert the rate of photodecomposition of samples directly to riboflavin concentration.

Riboflavin, also known as vitamin $B_2$, is a water soluble, yellow orange fluorescent pigment with the following structure:

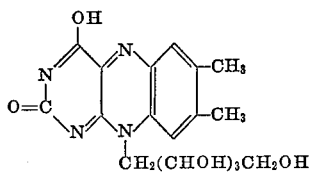

Generally it is stable to acid and oxidation, but rapidly destroped by alkali at elevated temperatures and by light.

Riboflavin is found mostly in milk, egg white, liver, and leafy vegetables, and is a dietary requirement of animals. A deficiency thereof results in poor growth, and other pathological changes in the skin, eyes, liver and nerves.

Riboflavin is found in all tissues with its concentration usually paralleling metabolic activity. Riboflavin requirements do not appear to be related to caloric requirements or muscular activity, but are affected by heredity, growth, environment, age and health. Evidence suggest the need for increased riboflavin in low protein diets because of a decreased ability of the liver to retain the vitamin.

Little attention has been given to blood riboflavin concentration although urine excretion of the vitamin has been extensively investigated. This has been primarily due to the absence of a specific and simple method of determination applicable to large numbers of samples.

The red blood cell content, however, is a sensitive and practical index for evaluating the nutritive status of the vitamin in the human body. Blood riboflavin concentration also tends to be a permanent record of the nutritional status of individuals or population groups. Urinary excretion data, on the other hand, reflects the current riboflavin intake. Although not an accurate record of nutritional status, urinary riboflavin excretion data is essential to interpretation of blood concentration data to provide a complete picture of the changes which occur in disease. For example, kidney disease probably increases blood riboflavin concentration by raising the renal threshold. Simultaneous examination of blood and urine shall be required as a diagnostic tool to clarify the role of riboflavin in metabolic disturbances particularly in lever disease and diabetes mellitus.

Although as mentioned above, urine excretion of this vitamin has been extensively investigated, evaluation of the blood cell content has been subject to a great variation in range of concentrations depending on the method of determination. Even though the photodecomposition curve for riboflavin is unique, and the percentage decomposition of riboflavin is independent of its initial concentration, prior photodecomposition methods were not of sufficient simplicity and accuracy to be satisfactory for large numbers of determinations.

Riboflavin may be determined by microbiological methods using the lactic acid-forming organism *Lactobacillus casei*, which requires the vitamin for growth, or it may also be determined by chemical methods wherein its fluorescent properties are used. Microbiological methods are extremely time consuming, requiring incubation of from one to two days, and therefore are not suitable for rapid laboratory methods utilizing large numbers of samples. Prior chemical methods, while somewhat faster, were inaccurate, producing a wide variation of results depending on the method utilized.

As described in my articles appearing in volume 39, International Journal for Vitamin Research, No. 2, pages 182–191 and No. 3, pages 246–251 (1969), it is known that bound riboflavin in blood samples may be extracted with heat and trichloroacetic acid, and that the extract when exposed to light decomposes losing its fluorescent properties. Unfortunately, heat destroys riboflavin to some extent and tends to activate non-riboflavin fluorescent substances which are normally present in the extract. One prior method utilized sodium hydrosulphite to reduce these substances and thereby avoid their influence for photofluorimetric analysis. Another method attempted to correct the values obtained by photofluorimetry through the isolation of these substances with chloroform.

Other methods have utilized an internal standard for photofluorimetric analysis consisting of a sample having a known quantity of riboflavin added. The prior procedures, however, utilized an indirect internal standard wherein riboflavin in the sample was extracted, and known quantity of riboflavin subsequently added to the extract.

It has been discovered that uniform exposure of the sample and standard without excessive heating suppresses the production of slowly light liable non riboflaven fluorescent substances, and that by using a direct internal standard any riboflavin destroyed during removal of the fluorescent non riboflavin substances normally in an extract, is compensated for and does not affect the riboflavin photodecomposition determination.

A direct internal standard as utilized by the procedure of this invention comprises the addition of a known quantity of riboflavin directly to an identical sample, followed by identical extraction and decomposition procedures applied to both the standard and the unknown.

Because the percentage destruction of riboflavin is a function of time and does not depend on the initial concentration thereof, the decomposition of the standard as shown by the magnitude of the change in photofluorimetric readings before and after a given exposure time bears a direct relationship to the initial concentration of riboflavin. Therefore, if a direct internal standard is extracted and exposed in a procedure identical to that employed on the unknown, the decomposition of the standard may be corrected for the riboflavin present before addition of the known quantity. The corrected reading of the standard as compared to that amount of riboflavin added, will be proportional to the dedomposition reading of the unknown as compared to the initial concentration thereof.

Accordingly, it is an object of this invention to provide a photodecomposition apparatus for large numbers of samples to accurately and uniformly decompose the light liable fluorescent substances in said samples.

It is another object to provide a photodecomposition apparatus for use in photofluorimetric determinations of riboflavin concentrations adapted to uniformly expose containers of riboflavin extract solutions without heating the said solutions.

It is another object to provide a photodecomposition apparatus for uniform, controlled photodecomposition having mutually spaced, parallel rows of upright sample holders and a longitudinally aligned, parallel fluorescent lamp means disposed thereover for uniformly exposing the tubular sample containers without substantially heating samples in the said containers.

It is a further object to provide a vertically adjustable fluorescent lamp means in a photodecomposition apparatus for uniform exposure of samples disposed in tubular containers and held in mutually spaced alignment thereunder for use in photofluorimetric analysis of the said samples.

It is yet another object to provide a method of determining riboflavin concentration through controlled, uniform photodecomposition of an unknown riboflavin containing solution and a direct internal standard applicable to large numbers of rapid photofluorimetric analyses.

It is still another object to provide a rapid accurate and uniform method for use with either a photofluorimeter or a microphotofluorimeter for controlled uniform photodecomposition of riboflavin in a plurality of samples to evaluate the initial concentration thereof as compared to a standard solution.

These and other objects will become readily apparent with reference to the following drawings and discussions wherein:

FIG. 1 is a plan view of a photodecomposition apparatus of this invention;

FIG. 2 is an end view of the apparatus of this invention;

FIG. 3 is a graph depicting the rate of photodecomposition of flourescent substances in the extract as compared to the riboflavin concentration in a whole blood sample;

FIG. 4 is a graph depicting the rate of photodecomposition of riboflavin in a direct internal statndard as compared to that of riboflavin in whole blood; and FIG. 5 is a fragmentary view of the apparatus of FIG. 2.

With reference to the drawings and particularly FIGS. 1 and 2 the photodecomposition apparatus of this invention consists of a rack 10 mounted on a base 12. Base 12 also supports vertical uprights 14 disposed at each end of said base. Uprights 14 are rigidly attached to said base as shown in FIG. 2, by any well known attachment means 15 which may include bolts.

A height adjusting means 16 which may be a screw adjustably mounts fluorescent lamps 18 on uprights 14, as screw 16 passes through slot 20 in upright 14 and is threadedly received in lamp mounting frame 21.

Lamp mounting frame 21 carries fluorescent lamps 18 and an angled reflector 22 for directing light from lamps 18 downwardly onto cuvettes 26 disposed in rack 10.

In the preferred embodiment fluorescent lamps 18 are 120 cm. long and of the 40 watt, tropical daylight variety having wave length from 360–720 m$\mu$ with a peak of 480 m$\mu$. Typically lamps 18 are mounted in parallel alignment in the same horizontal plane, approximately 1.5 cm. apart. The horizontal plane of the lamps must be parallel to base 12.

Mutually spaced, longitudinal rows 24 of specimen cuvettes 26 are disposed in longitudinal alignment with lamps 18, and as shown in FIG. 5, the longitudinal axis of each lamp must be disposed in a vertical plane spaced equal distantly from the axes of cuvettes in adjacent rows 24. It will be obvious that rack 10 may comprise any number of rows 24, however, a lamp 18 must be disposed over no more than a pair of adjacent rows 24 for uniform exposure as shown in FIG. 5.

Although tubular specimen containers 26 are referred to as cuvettes the type of container will depend on the type of photofluorimeter utilized as hereinafter described to analyze the specimen of photodecomposition. For example, if a Coleman Model 12C photofluorimeter is used Coleman cuvettes, 19 x 105 mm. may be employed as a specimen container 26. In addition, if a micro photofluorimeter is utilized microphotofluorimeter tubes, 5 cm. long with a 1.8 mm. bore may be used.

The following is a description of the method of utilizing the photodecomposition apparatus of this invention for controlled,incomplete photodecomposition of riboflavin from whole blood samples to evaluate the initial riboflavin concentration therein.

ANALYSIS OF BLOOD SAMPLES

The following agents were used. Riboflavin, obtained from Nutritional Biochemicals Corporation, was dissolved in the ratio of 10 mg. to 100 ml. in a 3% (w./v.) acetic acid solution and stored in dark bottles at 4d.

The following solutions were prepared on the day of use: (a) 40% (w./v.) trichloroacetic acid in water; (b) 6% (w./v.) $KMnO_4$; (c) 6% (v./v.) $H_2O_2$ in water; (d) 8 ml. of redistilled pyridine mixed with 92 ml. of redistilled normal butanol; (e) from a stock solution of 10 mg. of sodium fluorescein in 1 litre of water, stored in a dark bottle at 4° C., 1 ml. was diluted to 200 ml. with water.

A Coleman Model 12C photofluorimeter with primary filter passing chiefly the 436 m$\mu$ mercury line and secondary filter cutting off below the 530 m$\mu$ mercury line was employed for analysis. Cuvettes, Coleman, 19 x 105 mm. and the photodecomposition apparatus of this invention were utilized.

Throughout the following procedure bright room light was avoided. 6 ml. of unclotted whole blood were pipetted into each of two 20 ml. Pyrex glass stoppered test tubes labeled A and B. With shaking to tube A was added 1 ml. of water and to tube B 1 ml. (0.72 $\mu$g.) of riboflavin standard solution. To a third tube labeled C was added 7 ml. of water. To each A, B and C were mixed 5 ml. of trichloroacetic acid solution. The tubes were sealed with aluminum foil and heated in a water-bath at a temperature of 100° C. for 15 minutes, in the dark with shaking every 3 to 5 minutes. An electric fan was used to cool the upper ends of the tubes during heating. The solutions were then allowed to cool to room temperature in the dark. Tubes A and B were centrifuged at 2,000 rev./min. for 10 minutes.

From (A), 2 ml. of supernatant were pipetted into each of three glass stoppered test tubes labeled A, $A_1$, $A_2$, from (B) 2 ml. into each B, $B_1$, $B_2$ and from (C) 2 ml. into C. To each A, $A_1$, $A_2$, B, $B_1$, $B_2$ and C were added with shaking 4 drops (0.2 ml.) of $KMnO_4$ solution for 1 minute. Four drops (0.2 ml.) of $H_2O_2$ solution were then added to remove the excess $KMnO_4$. However, if the $KMnO_4$ was reduced before 1 minute then the addition of 4 drops was repeated at intervals of one minute until the colour persisted for 1 minute, and then 4 drops of $H_2O_2$ solution were added.

To each solution were added 1 g. of anhydrous $Na_2SO_4$ through a long stemmed funnel and 5 ml. of butanol-pyridine mixture. The tubes were placed in a water-bath and heated to 45° to 60° C. The $Na_2SO_4$ cake was dislodged by shaking. The tubes were cooled to room temperature in the dark. They were stoppered with corks covered with parafilm and shaken vigourously for 2 minutes. They were then centrifuged at 2,000 rev./min for 10 minutes.

From each tube 5, ml. of the upper (butanol-pyridine) layer was pipetted into cuvettes. The fluorimeter was standardized with fluorescein solution to read 65 scale units. The solutions in the cuvettes were read and then irradiated for 40 to 70 min on the photodecomposition apparatus of this invention with the lamps approximately 6 cm. from the solution levels (60 to 80% destruction), and read a second time.

The reading after irradiation of each solution was subtracted from the initial readings. Let the average change in solutions A, $A_1$, $A_2=a$, the average change in solutions B, $B_1$, $B_2=b$ and change in blank $C=c$.

The μg of riboflavin per 100 ml. of whole blood=

$$\frac{a-c}{b-a} \times 12$$

when riboflavin standard added was 0.72 μg. Change in blank C was usually negligible.

It has been found that complete hydrolysis of flavine adenine dinucleotide may be effected by heating for 10 minutes at 100° in 5 or 10% (w./v.) trichloroacetic acid. In the above method the concentration of trichloroacetic acid in the mixture with whole blood was approximately 17% (w./v.). The results obtained after 10 to 15 min. of heating with acid at 100° were identical with that when the mixture was incubated at 38° for 24 hours. Also when samples of the same blood were (a) heated with acid for 15 min. at 100°, and (b) heated with acid for 15 min. at 100° and then incubated at 38° for 24 hours, the riboflavin content in each sample was found to be the same. There was no increase in riboflavin content beyond 15 minutes of heating at 100°. But when the hydrosulphite reduction method described above was applied to the acid-heat extract of blood a significant progressive increase in *apparent* riboflavin with heating was noted.

As much as 2 ml. of 6% (w./v.) $KMnO_4$ to 1 ml. of extract has been used elsewhere for removal of non-riboflavin fluorescent substances in biological determinations. In the proecdure of this invention, only 0.2 ml. of 6% $KMnO_4$ was added to 2 ml. of extract at intervals of 1 min. Accurate timing here was important. This titration further minimized the destruction of riboflavin and any loss was compensated for by the internal standard procedure. Adequate $KMnO_4$ removed all light-labile fluorescent substances and gave riboflavin values that did not vary with the degree of photodecomposition as shown in a test for specificity to be hereinafter described.

It was found that one volume of butanol-pyridine solution could extract up to two volumes of 20% (w./v.) trichloroacetic acid without affecting the percentage recovery of riboflavin. In the method of this invention, the volume of trichloroacetic acid is less than half of the volume of extracting butanol-pyridine solution. One gram of sodium sulphate was sufficient to saturate the aqueous phase.

The rate of destruction was consistent in cuvettes in the same row, and 65 to 70% destruction was obtained in 40 minutes with the lamps 6 cm. from solutions levels. This could be varied by raising and lowering the lamps. Of various sources of light studied the daylight fluorescent lamp proved to be the most convenient and effective, and it eliminated dependence on sunlight. A 100 watt Tungsten bulb gave an inadequate rate of destruction, and caused heating of solutions with resulting error due to slowly labile non-riboflavin fluorescent substances.

With the Coleman Model 12C photofluorimeter, a linear relationship between the difference in fluorimetric readings by irradiation and μg. of riboflavin in the sample was established up to 93% destruction of riboflavin when only 5 ml. of butanol-pyridine extract were read. A linear relationship also existed between the concentration of riboflavin in samples of whole blood and the rates of photodecomposition of extracts. To 6 ml. samples of whole blood which had been found to contain 0.85 μg. of riboflavin were added 0.84 and 1.68 μg. of riboflavin. The difference in fluorometric scale units read before and after irradiation was a measure of photodecomposition. The graph FIG. 3, depicts this linear relationship, and shows that it is independent of the amount of irradiation. Further experimentation showed this linear relationship to exist up to at least 2.53 μg. in 6 ml. whole blood sample (i.e. 42 μg./100 ml. of whole blood).

Unlike other methods, riboflavin standard solution was added directly to whole blood (direct internal standard). Results were higher than when riboflavin standard solution was added after extraction (indirect internal standard). An internal standard of 0.72 μg. was mainly used because this gives a factor with most samples of whole blood which is not less than 0.66 or more than 1.5. The specificity of the method was examined by adding riboflavin 16.7 μg./100 ml. and 14.4 μg./100 ml. to whole blood which by previous assay contained 14.2 μg./100 ml. riboflavin. Butanol-pyridine extracts were irradiated and fluorometric readings made at intervals of time up to 75 minutes. This resulted in a final 98% destruction of riboflavin. FIG. 4 shows the photodecomposition curves of the extract of total riboflavin of whole blood, and shows that these curves are similar. The test for specificity was applied in the determination of riboflavin content of 58 different blood samples which were both normal and pathological. The standard deviation was ±0.4 μg. perecent between determinations done at 60 to 70% and at 80 to 90% destruction. (The estimated standard deviation=$\sqrt{\Sigma\Delta^2/(2 \times N)}$, where $\Delta$=the difference between the duplicate determinations at different percent destruction and $N$=the number of whole blood analysed.)

The method was applied to whole blood and to corresponding samples with added riboflavin. The percentage recovered varied from 97 to 103% in eight such experiments. (See Table I below.)

TABLE 1.—SUMMARY OF RECOVERY RESULTS

| Whole Blood | Riboflavin in sample, μg./100 ml. | Riboflavin added, flavin found, μg./100 ml. | Total riboflavin found, μg./100 ml. | Recovery, percent |
|---|---|---|---|---|
| A | 14.2 | 2.2 | 15.9 | 97 |
| A | 14.2 | 3.3 | 16.9 | 97 |
| A | 14.2 | 14.0 | 29.6 | 103 |
| A | 13.9 | 14.4 | 29.7 | 103 |
| B | 13.1 | 14.0 | 28.0 | 103 |
| C | 11.1 | 12.0 | 23.5 | 102 |
| D | 12.6 | 12.0 | 25.7 | 103 |

The blood riboflavin level was determined in 33 adults who on routine medical examination showed no evidence of the disease. The range of values was 9.8–22.4 with a mean of 14.6 and a standard deviation (S.D.) of ±3.3 μg./100 ml. The mean corpuscular riboflavin concentration was 21.8–61.5, mean 38.4±10.5 (S.D.) μg./100 ml. Random whole blood samples were taken from donors at intervals of time and separate determinations were made. The percentage of packed cells was estimated by a micro-haematocrit centrifuge with capillary tubing. The riboflavin level was found to maintain a constant relationship with the falling packed cell volume. (See Table II below.)

TABLE II.—RIBOFLAVIN LEVELS IN WHOLE BLOOD RELATED TO THE PACKED CELL VOLUME

| Date of donation of whole blood | Quantity donated, ml. | Packed cell volume, percent | Riboflavin, μg./100 ml. whole blood | Mean corpuscular riboflavin concentration (μg., percent)[1] |
|---|---|---|---|---|
| April 16, 1966 | 150 | 41 | 14.9 | 36 |
| April 23, 1966 | 100 | 40 | 14.2 | 36 |
| May 6, 1966 | 100 | 40 | 14.3 | 36 |
| May 19, 1966 | 150 | 39 | 13.9 | 36 |
| June 2, 1966 | 100 | 36 | 13.4 | 37 |

[1] Mean corpuscular riboflavin concentration
$= \frac{\text{riboflavin, μg./100 ml.}}{\text{packed cell volume}} \times 100$ Three subjects with relatively low blood riboflavin levels were treated by vitamin B-complex orally and intramuscularly. A rise in blood level was observed in each case after treatment was discontinued. (See Table III below.)

TABLE III.—CHANGES IN BLOOD RIBOFLAVIN VALUES FOLLOWING VITAMIN B-COMPLEX THERAPY

| Condition of subject | Relationship to treatment | Date of test (1966) | Riboflavin | | |
|---|---|---|---|---|---|
| | | | μg./100 ml. | Mean corpuscular concentration | μg./gm. of hemoglobin |
| Chronic alcoholic with liver disease and recurrent nephritis. | Before | July 4 | 7.7 | 20.0 | 0.57 |
| | After | Aug. 22 | 24.1 | 65.1 | 1.79 |
| Acute infectious hepatitis | Before | Aug. 15 | 10.1 | 25.0 | 0.79 |
| | After | Aug. 26 | 13.8 | 36.3 | 0.99 |
| | Further | Sept. 21 | 12.7 | 31.8 | |
| Cirrhosis of the liver | Before | June 21 | 9.3 | 23.2 | 0.74 |
| | After | Aug. 15 | 11.0 | 26.8 | 0.86 |

When random non-fasting blood levels were compared with over-night fasting levels a fall was noted in the latter. In 3 normal subjects the mean of this difference was 3.7 μg./100 ml. Riboflavin blood levels in pathological conditions were compared with those of normal subjects. A relative rise in persons with kidney disease was noted. While often blood levels were apparently unaffected by severe liver disease, in diabetes mellitus they tended to be lower. But when associated with kidney disease both liver disease and diabetes showed higher levels. (See Table IV below.)

TABLE IV.—BLOOD RIBOFLAVIN LEVELS IN NORMAL AND IN PATHOLOGICAL CONDITIONS

[Results are given as mean values ±S.D.]

| Number of subjects | Condition | Riboflavin (μg./100 ml.) | |
|---|---|---|---|
| | | Range | Mean |
| 33 | Normal | 9.8–22.4 | 14.6±3.3 |
| 6 | Kidney disease | 17.1–24.0 | 19.1±2.6 |
| 4 | Diabetes mellitus (no kidney disease) | 8.8–11.8 | 10.0±1.1 |
| 4 | Diabetes mellitus (with kidney disease) | 18.3–24.5 | 21.4±2.8 |
| 10 | Liver disease (no kidney disease) | 9.3–81.1 | 12.3±2.8 |
| 3 | Liver disease (with kidney disease) | 16.3–24.1 | 20.1 |
| 3 | Syphilis | 11.4–13.4 | 12.7 |

URINE SAMPLE ANALYSIS

The following is a description of the method utilizing the photodecomposition apparatus of this invention for controlled and complete photodecomposition of riboflavin from urine samples to evaluate the riboflavin concentration therein, and to formulate a conversion factor for utilization with a large number of riboflavin containing samples.

The materials utilized in this analysis were (a) glacial acetic acid; (b) riboflavin obtained from Nutritional Biochemicals Corp., 100 mg. being dissolved in 1 litre of water containing 0.5 ml. of glacial acetic acid and stored in a dark bottle at 4° C. On the day of the test this was diluted with water to give standard solutions; (c) 6% (w./v.) $KMnO_4$ aqueous solution prepared on day of use; (d) 6% (v./v.) $H_2O_2$ in water; (e) anhydrous $Na_2SO_4$; (f) a mixture of 8 ml. of redistilled pyridine with 92 ml. of redistilled iso-butanol; (g) a stock solution of 10 mg. of sodium fluorescein in 1 litre of water stored in the dark at 4°; 2 ml. were diluted to 200 ml. with water.

A Coleman Model 12C photofluorimeter was also used in this analysis. The fluorimeter had a primary filter passing chiefly the 436 mμ mercury line and a secondary filter cutting off below 530 mμ mercury line. Coleman, Cuvettes, 19 x 105 mm. were also used with the photodecomposition apparatus of this invention.

Throughout the procedure bright room light was avoided. Standard solutions were prepared containing 0.5, 1.0, 2.0 and 4.0 μg. of riboflavin per ml. This range was convenient for urine samples following saturation testing. A corresponding lower range of 0.1–0.8 μg./ml. was applied for causal urine samples. 1 ml. of each of these solutions, duplicate 1 ml. samples of urine to be tested, and 1 ml. of water was added to each and to 0.5 ml. of acetic acid in 20 ml. Pyrex test tubes. (If urine samples were found to contain more than 4 μg. per ml. they were diluted 1:1 with water and 1 ml. of solution was added.) Into each were mixed 5 drops (0.25 ml.) of $KMnO_4$ solution and let stand for 1 minute. 5 drops (0.25 ml.) of $H_2O_2$ was applied to remove excess $KMnO_4$. 1.5 gm. of $Na_2SO_4$ were added by a long stemmed funnel, followed by 12 ml. of butanol-pyridine solution. The solutions were heated on a water bath to 45 to 60° C. The $Na_2SO_4$ cake was dislodged by shaking. They were then cooled to room temperature and shaken vigorously for 2 minutes. All solutions were centrifuged at 2,000 rev./min. for 10 minutes. 10 ml. of each butanol-pyridine layer was pipetted into a cuvette. The fluorimeter was standardized with fluorescein solution to read 75 scale units. The solutions in the cuvettes were read, then irradiated for 40 minutes (85% destructions) and a second reading was taken.

The reduction of fluorimetric reading of the chemical blank was subtracted from the reduction in reading of each standard solution. The concentration in μg. per ml. of the respective standard solutions was divided by the corrected reduction due to riboflavin in each standard solution to give a factor at each level of concentration. The factor average times the average corrected reduction of duplicate urine extracts gave the value of riboflavin in each urine sample in μg per ml. A series of urines were determined by the same factor.

It was found that when 12 ml. of butanol-pyridine solution were used the fluorimeter readings were proportional to the concentration of riboflavin in the original solutions up to at least 4.0 μg. of riboflavin. Isobutyl-alcohol was used for extraction because of its availability. Results were identical with those obtained with n-butanol.

A straight line relationship was found to exist between reduction in fluorescence of extract by photodecomposition and μg. of riboflavin in solution from 0.5 to 4.0 μg./ml. and from 0.1 to 0.8 μg./ml. Almost all urine samples of saturation tests when diluted 1:1 with water fell in the range 0.5–4.0 μg./ml. The factor average for this range was found to accurately convert fluorimetric readings when urine concentrations were as low as 0.25 μg./ml. All determinations by the conversion factor method were checked by the internal standard procedure described above. No significant difference in results were discovered.

It was also found that in samples of low concentration, when up to 3 ml. of urine were taken and the factor derived by using 1 ml. amounts of riboflavin standard solutions was applied, the results were similar to those obtained by the internal standard method and recovery of added riboflavin was accurate.

By carefully standardizing procedure and apparatus it was possible to produce a constant factor average on different days. Thus it was possible to use the same factor average for a series of different determinations.

In normal as well as pathological urines there was no significant difference between the results of conversion factor and internal standard methods. This was true in grossly discolored and concentrated urines such as those of persons with infectious hepatitis. Thus no significant quenching of fluorescence in the urine extracts could be demonstrated.

When the rates of destruction of the butanol-pyridine extracts of urine and standard riboflavin solutions were compared they were found to be identical. This comparison was used as a test of specificity. The standard deviation between determinations of 13 urine samples at 75% and at 85% destruction was 0.018 µg. Estimated Standard Deviation $=\sqrt{\Sigma\Delta^2/(2\times N)}$, where $\Delta=$the difference between determinations at different percent destruction and $N=$the number of urines analysed.

Casual urine riboflavin determinations on 10 adults, who on routine medical examination showed no evidence of disease, gave ranges of 0.04–0.98, mean 0.29 and a standard deviation (S.D.) of ±0.28 µg./ml. When related to creatinine excretion these showed ranges of 33–725, mean 179±186 (S.D.) µg./gm. of creatinine. Creatinine was determined by the method of Folin and Wu, Journal Biol. Chem. 38,98 (1919). Of these subjects 4 excreted between 27 to 79 µg./gm. of creatinine. This was in keeping with the findings of a nutritional survey in the same region, Trinidad, by the Interdepartmental Committee on Nutrition for National Defense (1961). Here 39.1% of all adults were considered in this low category.

Saturation tests were performed on apparently healthy adults who received an oral dose of 1 mg. of riboflavin per 30 pounds of body weight. Six-hour urine samples were collected. To ensure an adequate collection urine samples with a volume of less than 150 ml. and total creatinine of less than 200 mg. were discarded. Urine riboflavin values in 20 adults were 12–48, means 28±10.2 (S.D.) µg. percent of test-dose.

In normal and pathological conditions studied no relationship was evident between casual urine riboflavin determinations related to creatinine excretion, and the results of saturation tests. (See Table V below.)

TABLE V.—COMPARISON OF RESULTS OF ASSESSING RIBOFLAVIN NUTRITIVE STATUS BY URINE RIBOFLAVIN DETERMINATION

| State of health | Casual urine riboflavin µg./ml. | µg./gm. of creatinine | Riboflavin saturation tests, µg. percent of test-dose |
|---|---|---|---|
| Normal | 0.98 | 725 | 19.2 |
| Do | 0.15 | 97 | 19.3 |
| Do | 0.39 | 157 | 22.4 |
| Do | 0.17 | 170 | 12.0 |
| Do | 0.05 | 33 | 48.3 |
| Do | 0.11 | 51 | 27.4 |
| Liver disease (carcinoma) | 1.28 | 2,300 | 18.4 |
| Liver disease (acute infectious hepatitis) | 4.04 | 1,000 | 0.3 |
| Liver disease (chronic alcoholism) | 0.55 | 198 | 17.0 |
| Kidney disease (chronic nephritis) | 0.12 | 78 | 9.9 |

The invention as hereinabove described includes a photodecomposition apparatus for controlled, uniform, incomplete decomposition of fluorescent substances and two methods for its utilization to detect the riboflavin concentration in whole blood and the riboflavin concentration in urine samples. The apparatus includes a rack disposed to hold a plurality of tubular sample containers, upright, in parallel rows, and a vertically adjustable overhead fluorescent lamp means. The lamp means is disposed in a longitudinally aligned relationship with the rows of samples having at least one bulb disposed over no more than two adjacent parallel rows of tubular sample containers. The apparatus is intended for use with the conventional photofluorimeter or microphotofluorimeter wherein an initial reading of the sample is taken, the sample is exposed to the fluorescent lamp means for a preselected time, and then a final fluorimeter reading is taken.

A method for the determination of riboflavin concentration in whole blood has been presented wherein an unknown sample and a direct internal standard are subjected to extraction by trichloroacetic acid and heat followed by treatment with potassium permanganate and hydrogen peroxide to destroy non riboflavin, light labile, fluorescent substances, and final riboflavin extraction with a butanol-pyridine mixture. The fluorescence of the samples is then determined by initial reading in a fluorimeter. The samples are subjected to a controlled exposure to fluorescent light for a preselected period of time, and then the final fluorimeter reading is taken. Through use of an averaging technique a highly accurate proportionality relationship was found to exist between initial concentration and photodecomposition of the direct internal standard and the photodecomposition of the unknown. This proportionality relationship was used to determine the initial blood riboflavin concentration.

A method has also been described for obtaining the riboflavin concentration of urine samples. The urine sample and a standard are subjected to potassium permanganate and hydrogen peroxide, followed by extraction with a butanol-pyridine solution. The rates of photodecomposition of riboflavin in extracts of standard solutions were determined fluorimetrically and related to the concentrations of riboflavin in these solutions. A factor was derived from each standard solution. The average of these factors was applied to convert the rate of photodecomposition of extracted urine to urine riboflavin concentration. Results of this method, in relation to urine samples, were found to be closely similar to the internal standard method disclosed above.

Through the use of the apparatus of this invention to uniformly expose large numbers of sample containers for controlled, incomplete photodecomposition of fluorescent substances therein, it has been possible to derive a rapid and efficient technique applicable to multiple samples for diagnosing the riboflavin nutritional status in an individual through analysis of blood and urine samples. The photodecomposition apparatus of this invention has proven to be essential to the analysis of riboflavin and nutritional status, and when utilized in blood and urine analysis, a valuable diagnostic tool in evaluating metabolic disturbances.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A photodecomposition method for calculating the riboflavin concentration of unclotted blood comprising:
   (a) selecting a first and a second sample of said blood;
   (b) adding a known quantity of riboflavin to said second sample;
   (c) extracting the riboflavin from said samples by heating said samples with trichloroacetic acid:
   (d) collecting the supernatant from said samples;
   (e) oxidizing non-riboflavin fluorescent substances in said supernatant by adding potassium permanganate to said supernatant.
   (f) removing the excess potassium permanganate from said supernatant by adding hydrogen peroxide to said liquid;

(g) extracting the riboflavin from the supernatant collection from said first and second samples with a solution of butanol and pyridine said solution forming an upper riboflavin-containing layer;

(h) transferring a portion of the upper layer of said first collection to a first cuvette and a portion of the upper layer of said second collection to a second cuvette;

(i) placing said first cuvette in a photofluorimeter and measuring the fluorescence of the liquid therein;

(j) placing said second cuvette in photofluorimeter and measuring the fluorescence of the liquid therein;

(k) uniformly exposing said first and second cuvettes simultaneously to light from a tropical daylight fluorescent lamp disposed a preselected distance thereover until the riboflavin in the liquid in said cuvettes has been partially destroyed;

(l) re-measuring the fluorescence of the liquid in said first and second cuvettes in said photofluorimeter;

(m) calculating the riboflavin concentration in said first sample by subtracting the change in fluorimetric measurements of said first cuvette from the change in measurements of said second cuvette, and comparing the ratio of the difference and the known quantity of riboflavin added to the second sample with the change in fluorimetric measurements of said first cuvette.

2. The method of claim 1 wherein the riboflavin is extracted from said first and second samples by adding a 40% solution of trichloroacetic acid in water to each of said samples in the ratio of about 5 parts to 6 parts by volume and heating at about 100° centigrade for no longer than 15 minutes.

3. The method of claim 2 wherein the non riboflavin fluorescent substances in said first and second supernatant collections are oxidized by titrating each of said collections with a 6% solution of $KMnO_4$ in water by adding at least four drops of said solution to said collection at one minute intervals until the color of said solution persists for one minute.

4. The method of claim 3 wherein the excess potassium permanganate is removed from said collection by adding at least four drops of a 6% hydrogen peroxide solution in water to said collections.

5. The method of claim 4 wherein said riboflavin is extracted from said supernatant collections after oxidation of said non riboflavin fluorescent substances by adding one gram of anhydrous sodium sulphate and 5 ml. of a solution of eight parts pyridine in 92 parts butanol, by volume, for each 2 ml. of supernatant collection; and subsequently heating the mixture to between 45 and 60° C.

6. The method of calculating the riboflavin concentration in a urine sample comprising the steps of:

(a) preparing a plurality of standard solutions, said solutions having a riboflavin concentration range of between 0.1 and 4.0 µg./ml.;

(b) selecting a urine sample;

(c) titrating each of said standard solutions and said sample with potassium permanganate to oxidize the non riboflavin fluorescent substances therein;

(d) removing the excess potassium permanganate from said solutions and sample by adding hydrogen peroxide;

(e) extracting riboflavin from said solutions and sample by adding anhydrous sodium sulphate and a pyridine butanol solution and heating the said mixtures to form a riboflavin containing upper layers;

(f) transferring a preselected portion of said upper layer of each of said standard solutions and said sample into separate cuvettes, (g) measuring the fluorescence of each of said solutions in each cuvette in a photofluorimeter;

(h) uniformly exposing each of said cuvettes, simultaneously, to light from a tropical daylight fluorescent lamp disposed a preselected distance therefrom until the riboflavin in each solution in each cuvette has been partially destroyed;

(i) re-measuring the fluorescence of each solution in each cuvette in said photofluorimeter;

(j) calculating a conversion factor of the average change in fluorescence in the said standard solutions for a concentration of riboflavin;

(k) calculating the concentration of riboflavin in the said urine sample by converting the change in fluorescence of said sample solution with the said conversion factor to riboflavin concentration of said urine sample.

7. The method of claim 6 wherein the standard solutions have a range of concentration of from 0.1 to 0.8 µg. riboflavin per ml. solution.

8. The method of claim 6 wherein the standard solutions have a range of concentration of from 0.5–4.0 µg. riboflavin per ml. of solution.

9. The method of claim 6 wherein the non riboflavin substances in each standard solution and said sample are oxidized by successively adding to each over 1 minute intervals, five drops of a 6% potassium permanganate solution in water until said mixture color persists for 1 minute.

10. The method of claim 9 wherein the excess potassium permanganate is removed from said mixtures by adding five drops of a 6% hydrogen peroxide solution in water to each of said mixtures.

11. The method of claim 10 wherein the riboflavin is extracted from said standard solutions and sample by adding to each 1.5 gms. sodium sulphate and 12 ml. of a solution of eight parts pyridine in 92 parts butanol by volume for each ml. of said standard and sample.

12. The method of evaluating the nutritional status of riboflavin in a human comprising the steps of:

(a) collecting a first and a second blood sample;

(b) collecting a urine sample;

(c) preparing a plurality of standard solutions of riboflavin having a concentration range of from 0.1–4.0 µg. riboflavin per ml. of solution;

(d) adding a preselected quantity of riboflavin to said second blood sample;

(e) extracting the riboflavin from said blood sample by heating said samples in the presence of trichloroacetic acid at 100° for no longer than 15 minutes and collecting the supernatant from said first and second samples;

(f) oxidizing the non riboflavin fluorescent substances in said first and second collections, said standard solutions, and said urine sample by titrating with potassium permanganate;

(g) removing the excess potassium permanganate from each of said collections, solutions and sample by adding hydrogen peroxide;

(h) heating each of said collections, solutions, and sample in the presence of anhydrous sodium sulphate and a solution of 8 parts pyridine in 92 parts butanol by volume, to extract an upper riboflavin containing solution layer, a plurality of upper riboflavin containing solutions layers corresponding to said first and second blood samples, said standard solutions, and said urine sample;

(i) placing a portion of each of said upper layers in a plurality of cuvettes;

(j) measuring the fluorescence of the liquid in each of said cuvettes in a photofluorimeter;

(k) uniformly exposing said cuvettes simultaneously light from a tropical daylight fluorescent lamp disposed a preselected distance therefrom until the riboflavin in the liquid in each of said cuvettes has been partially destroyed;

(l) remeasuring the fluorescence of the liquid in each of said cuvettes in said photofluorimeter;

(m) calculating the riboflavin concentration in said first blood sample by subtracting the change in fluorimetric measurements of said first blood sample cuvette from the change in measurements of said second blood sample cuvette and comparing the ratio of the difference and the known quantity of riboflavin added to said second sample with the change in fluorimetric measurements of said first cuvette;

(n) calculating a conversion factor of the average change in fluorescence of the cuvettes corresponding to said standard solutions for a μg./ml. concentration of riboflavin in the said standard solutions;

(o) calculating the concentration of riboflavin in the said urine sample by converting the change in fluorescence of the said sample solution of the riboflavin concentration in the said urine samples from the average change in fluorescence for the riboflavin concentrations of said standard solutions.

References Cited

UNITED STATES PATENTS

| | | | |
|---|---|---|---|
| 2,384,778 | 9/1945 | Whitman | 250—43 |
| 2,889,837 | 6/1959 | Braun et al. | 21—102 X |
| 2,725,782 | 12/1955 | Worley | 356—39 |

OTHER REFERENCES

Najjar, V.A.; J. Biol. Chem. 141, 355 (1941).

Johnson et al.: Anal. Chem. 17, 384–386 (1945).

Elenbaas, W.: Fluorescent Lamps and Lighting, Philips Technical Library, 1962. Pages 32 and 33 relied on.

MORRIS O. WOLK, Primary Examiner

R. M. REESE, Assistant Examiner

U.S. Cl. X.R.

21—102; 23—253 R; 250—43